US007765451B2

(12) United States Patent
Yomo et al.

(10) Patent No.: US 7,765,451 B2
(45) Date of Patent: Jul. 27, 2010

(54) RETRANSMITTING APPARATUS AND METHOD USING RELAY STATION IN A MULTI-HOP NETWORK

(75) Inventors: Hiroyuki Yomo, Aalborg (DK); Simone Frattasi, Aalborg (DK); Petar Popovski, Aalborg (DK); Young-Bin Chang, Anyang-si (KR); Eun-Taek Lim, Suwon-si (KR); Young-Kwon Cho, Suwon-si (KR); Dong-Seek Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 832 days.

(21) Appl. No.: 11/607,282

(22) Filed: Dec. 1, 2006

(65) Prior Publication Data
US 2007/0245204 A1    Oct. 18, 2007

(30) Foreign Application Priority Data
Dec. 1, 2005    (KR) .................. 10-2005-0116333

(51) Int. Cl.
*H04L 1/18*    (2006.01)
(52) U.S. Cl. ...................... 714/749; 370/231
(58) Field of Classification Search ............... 714/749; 370/231
See application file for complete search history.

(56) References Cited

U.S. PATENT DOCUMENTS

| 5,555,266 | A  | * | 9/1996  | Buchholz et al. | ............ 370/347 |
| 5,963,559 | A  | * | 10/1999 | Ohki            | ............ 370/445 |
| 6,917,985 | B2 | * | 7/2005  | Madruga et al.  | ............ 709/238 |
| 6,992,982 | B1 | * | 1/2006  | Meyer et al.    | ............ 370/231 |
| 6,996,083 | B1 | * | 2/2006  | Balachandran et al. | ...... 370/337 |
| 7,096,400 | B2 | * | 8/2006  | Lim et al.      | ............ 714/748 |
| 7,184,421 | B1 | * | 2/2007  | Liu et al.      | ............ 370/338 |
| 2001/0034793 | A1 | * | 10/2001 | Madruga et al. | ............ 709/238 |
| 2002/0165973 | A1 | * | 11/2002 | Ben-Yehezkel et al. | ..... 709/230 |
| 2003/0174700 | A1 | * | 9/2003  | Ofek et al.     | .................. 370/389 |
| 2004/0190552 | A1 | * | 9/2004  | Kim et al.      | .................. 370/469 |

FOREIGN PATENT DOCUMENTS

WO    WO 2005/008947    1/2005

* cited by examiner

*Primary Examiner*—M. Mujtaba K Chaudry
(74) *Attorney, Agent, or Firm*—The Farrell Law Firm, LLP

(57) ABSTRACT

An apparatus and method for retransmitting data using an RS in a multi-hop network are provided. When retransmitting data in a BS, the BS transmits data and activates a timer therefor. The BS monitors receipt of a response message for the data until the timer expires. The BS receives the response message and, if it is a Non-Acknowledgement (NACK), determines whether an RS has successfully received the data with a BSN associated with the NACK. If the RS has not successfully received the data, the BS retransmits the data. If the RS has successfully received the data, the BS determines a retransmission entity. If the retransmission entity is the RS, the BS transmits a control message commanding retransmission to the RS, and if the retransmission entity is the BS, the BS retransmits the data.

21 Claims, 7 Drawing Sheets

RETRANSMITTING APPARATUS AND METHOD USING RELAY STATION IN A MULTI-HOP NETWORK

PRIORITY

This application claims priority under 35 U.S.C. §119 to an application filed in the Korean Intellectual Property Office on Dec. 1, 2005 and assigned Serial No. 2005-116333, the contents of which are incorporated herein by reference.

BACKGROUND OF THE INVENTION

1. Field of the Invention

The present invention relates generally to a multi-hop network, and in particular, to an apparatus and method for increasing retransmission efficiency by deciding which entity will retransmit when a Relay Station (RS) is available.

2. Description of the Related Art

Provisioning of services with diverse Quality of Service (QoS) levels at about 100 Mbps to users is an active study area for the future-generation 4$^{th}$ Generation (4G) communication system.

Particularly, active research is conducted to provide high-speed service by ensuring mobility and QoS to a Broadband Wireless Access (BWA) communication system such as Wireless Local Area Network (WLAN) and Wireless Metropolitan Area Network (WMAN). Such major examples are Institute of Electrical and Electronics Engineers (IEEE) 802.16d and IEEE 802.16e.

The IEEE 802.16d and IEEE 802.16e communication systems adopt Orthogonal Frequency Division Multiplexing/Orthogonal Frequency Division Multiple Access (OFDM/OFDMA) to physical channels of the WMAN system in order to support a broadband transmission network.

IEEE 802.16d considers only a single-cell structure with no regard to mobility of Subscriber Stations (SSs). In contrast, IEEE 802.16e supports the SS' mobility to the IEEE 802.16d communication system. Hereinafter, a mobile SS will be referred to as an MS.

Since signaling is carried out between an MS and a fixed Base Station (BS) via a direct link, a highly reliable radio communication link can be established between them in the conventional IEEE 802.16e communication system.

However, due to the fixedness of BSs, a wireless network cannot be flexibly configured. As a result, the IEEE 802.16e communication system is not effective in efficiently providing communication services under a radio environment experiencing a fluctuating traffic distribution and a substantial change in the number of required calls.

These problems can be solved by applying a multi-hop relay data transmission scheme using RSs to conventional cellular wireless communication systems such as IEEE 802.16e.

The multi-hop relay wireless communication system can advantageously reconfigure a network rapidly according to a communication environmental change and enables efficient operation of the entire wireless network.

The multi-hop relay scheme uses a fixed RS, a mobile RS and a basic RS for relaying.

Another force behind the introduction of the multi-hop relay scheme to the cellular network is that a shadowing area caused by weak received signal strength is covered and installation of RSs mitigates the constraint of initial installation cost in an early stage with low service requirements.

As the cellular network adopts the multi-hop relay scheme using RSs, a network can be reconfigured rapidly according to the change of a communication environment and the entire wireless network can efficiently operate.

However, signals sent and received among a BS, an MS and an RS are vulnerable to distortion because they communicate on radio channels. Therefore, there exists a need for further increasing reliability among the BS, the MS and the RS in the multi-hop relay cellular network.

When the BS sends data to the MS wirelessly, the MS checks errors in the received data. If errors are detected, the MS notifies the BS of the error detection and the BS retransmits the data, thus increasing the reliability of wireless data communication.

FIG. 1 illustrates a conventional retransmission operation using an RS. Referring to FIG. 1, data (DATA 1 (111) and DATA 2 (112)) to be sent from a BS 110 to an MS 120 takes the form of MAC Header, Payload, and Error Check Code in a Media Access Control (MAC) layer.

The BS 110 broadcasts the data through an antenna within its cell area. If direction communication with the BS 110 is available to the MS 120, the MS 120 receives the data 111 and 112 directly. If the direct communication is unavailable, an RS 130 receives data 131 and 132 and forwards it to the MS 120. That is, the MS 120 receives the data from the BS 110 or via the RS 130.

If errors are detected in data 122 (DATA 2), the MS 120 requests retransmission of the data to the BS 110 or the RS 130. Correspondingly, the BS 110 or the RS 130 retransmits data 113 or 133 (DATA 2) to the MS 120.

When the MS receives the retransmission data without errors, the data transmission from the BS 110 or the RS 130 is completed.

Yet, the data retransmission to the MS is insufficient for fast retransmission, avoiding mutual interference among the BS 110, the RS 130 and the MS 120.

Accordingly, there is a need for an apparatus and method for deciding when, and by which entity will data be retransmitted according to, for example, channel status in data retransmission among the BS 110, the RS 130 and the MS 120.

SUMMARY OF THE INVENTION

An object of the present invention is to substantially solve at least the above problems and/or disadvantages and to provide at least the advantages below. Accordingly, an object of the present invention is to provide an apparatus and method for determining an entity to retransmit data and a retransmission time, for efficient data retransmission among a BS, an RS and an MS.

Another object of the present invention is to provide an apparatus and method for retransmitting data to an MS by a minimum number of control messages, when data has transmission errors.

The above objects are achieved by providing an apparatus and method for retransmitting data using an RS in a multi-hop network.

According to the present invention, in a method of retransmitting data in a BS in a multi-hop network, the BS transmits data and activates a timer for the data. The BS monitors receipt of a response message for the data until the timer expires. The BS receives the response message and, if the response message is a Non-ACKnowledgement (NACK), determines whether an RS has successfully received the data with a BSN associated with the NACK. If the RS has not successfully received the data, the BS retransmits the data. If the RS has successfully received the data, the BS determines a retransmission entity. If the retransmission entity is the RS, the BS transmits a control message commanding retransmission to the RS, and if the retransmission entity is the BS, the BS retransmits the data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

The present invention provides an apparatus and method for retransmitting data using an RS in a multi-hop network.

While the present invention is described in the context of an OFDMA wireless communication system, it is to be clearly understood that the present invention is applicable to any other multiple access scheme.

Figure 1:
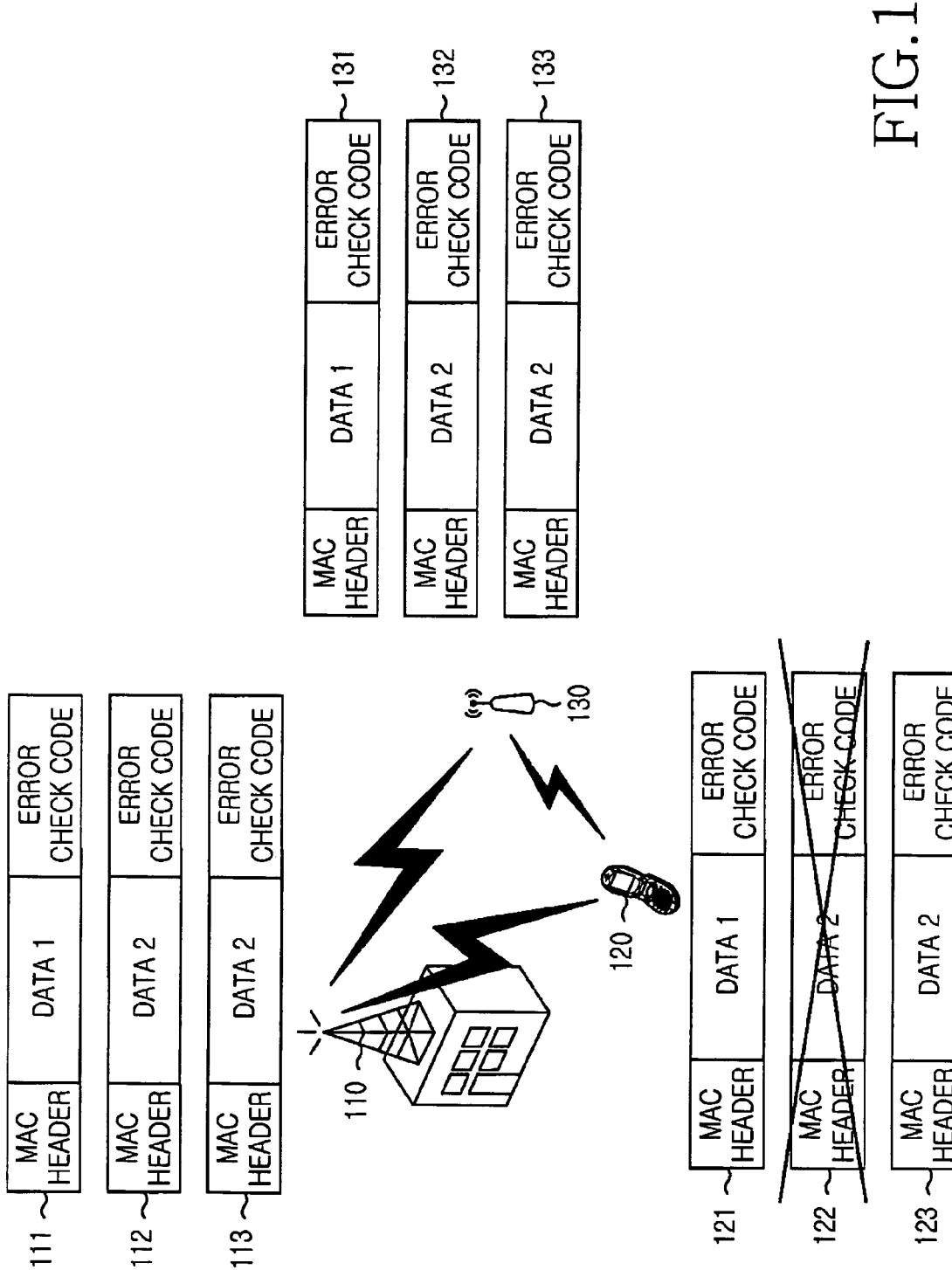
FIG. 1 illustrates a conventional retransmission operation using an RS.
Figure 2:
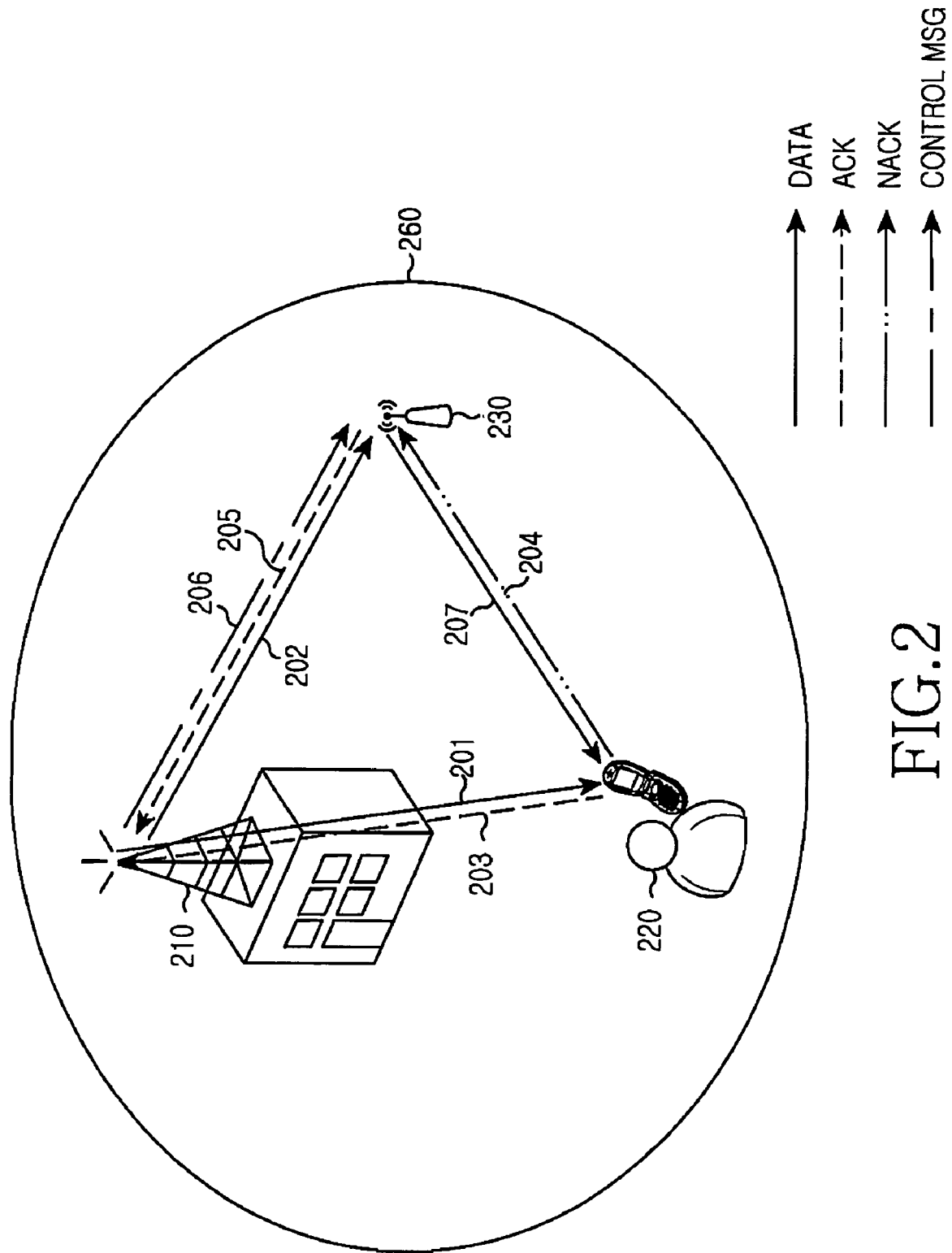
FIG. 2 illustrates a network configuration according to the present invention.

FIG. 2 illustrates a network configuration according to the present invention.

Referring to FIG. 2, a BS 210 has a cell area 260 within which an MS 220 receives data from the BS 210. An RS 230 can receive data from the BS 210 and relay it to the MS 220 on behalf of the BS 210. A plurality of RSs 230 may exist within the cell area 260. A service provider may install an RS separately or the MS 210 may serve as an RS.

The MS 220 receives data from the BS 210. If communications between the MS 220 and the BS 210 are not reliable, the MS 220 can receive the data via the RS 230.

Figure 3:
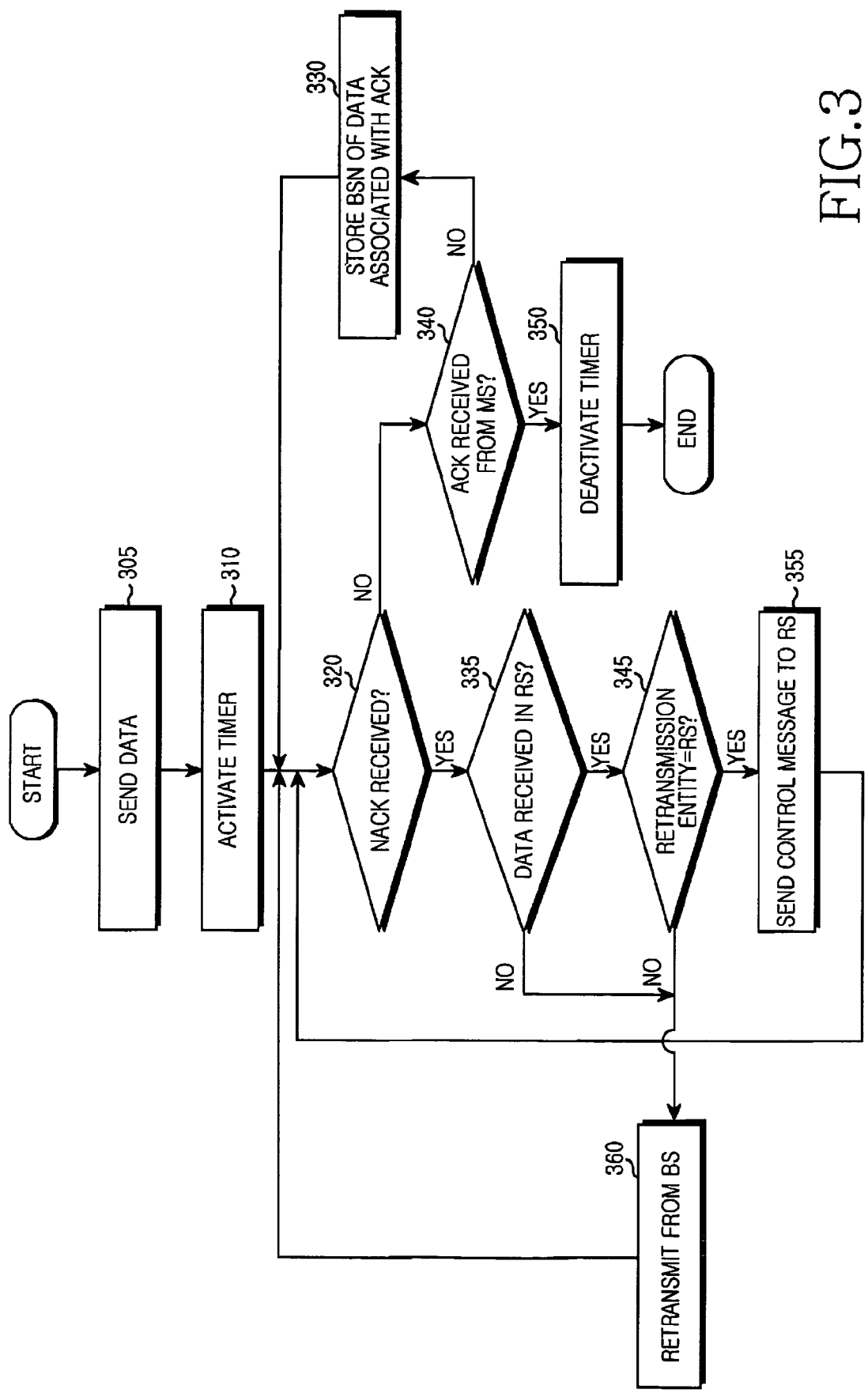
FIG. 3 is a flowchart illustrating a retransmission operation in a BS according to the present invention.

FIG. 3 is a flowchart illustrating a retransmission operation in the BS according to the present invention.

Referring to FIG. 3, the BS sends data to the MS in data blocks with unique Block Sequence Numbers (BSNs) in step 305 and activates a BSN-specific timer for counting time in relation to the BSN of a current data block in step 310.

The BS may receive an ACKnowledgement (ACK) or NACK for the transmitted data block from the MS or the RS. If the BS receives a NACK for the data block in step 320, it determines whether the RS has received the data block successfully in step 335. If the RS has failed to receive the data block, the BS retransmits the data block in step 360. And the procedure returns to the step 320.

If the RS has successfully received the data block in step 335, the BS determines whether to instruct the RS to retransmit the data block in step 345. If it is determined that the RS is not proper for the data retransmission, the BS retransmits the data block in step 360. And the procedure returns to the step 320.

If the BS determines that it is proper to select the RS as a retransmission entity, it sends a control message instructing data retransmission to the RS in step 355.

A criterion for selecting the RS as a retransmission entity is radio channel information or location information between the BS and the MS and channel information or location information between the RS and the MS. The radio channel information is a Received Signal Strength Indicator (RSSI) indicating the strength of a Radio Frequency (RF) signal or a Carrier-to-Interference and Noise Ratio (CINR) determining a transmission error rate. The location information is the Global Positioning System (GPS) coordinates of the BS, the RS and the MS.

The control message sent from the BS to the RS includes the BSN of the data block to be retransmitted, the Identifier (ID) of the MS and a data retransmission command.

If the BS receives a ACK (does not receive NACK) for the transmitted data block in step 320 and the ACK was from the RS in step 340, the BS stores the BSN of the data block associated with the ACK in step 330 and then returns to step 320.

If the ACK was from the MS in step 340, the BS deactivates the timer in step 350 and ends the data retransmission procedure for the BSN of the data block.

If the timer expires while the BS performs the retransmission for the BSN, the BS restarts the retransmission procedure.

Figure 4:
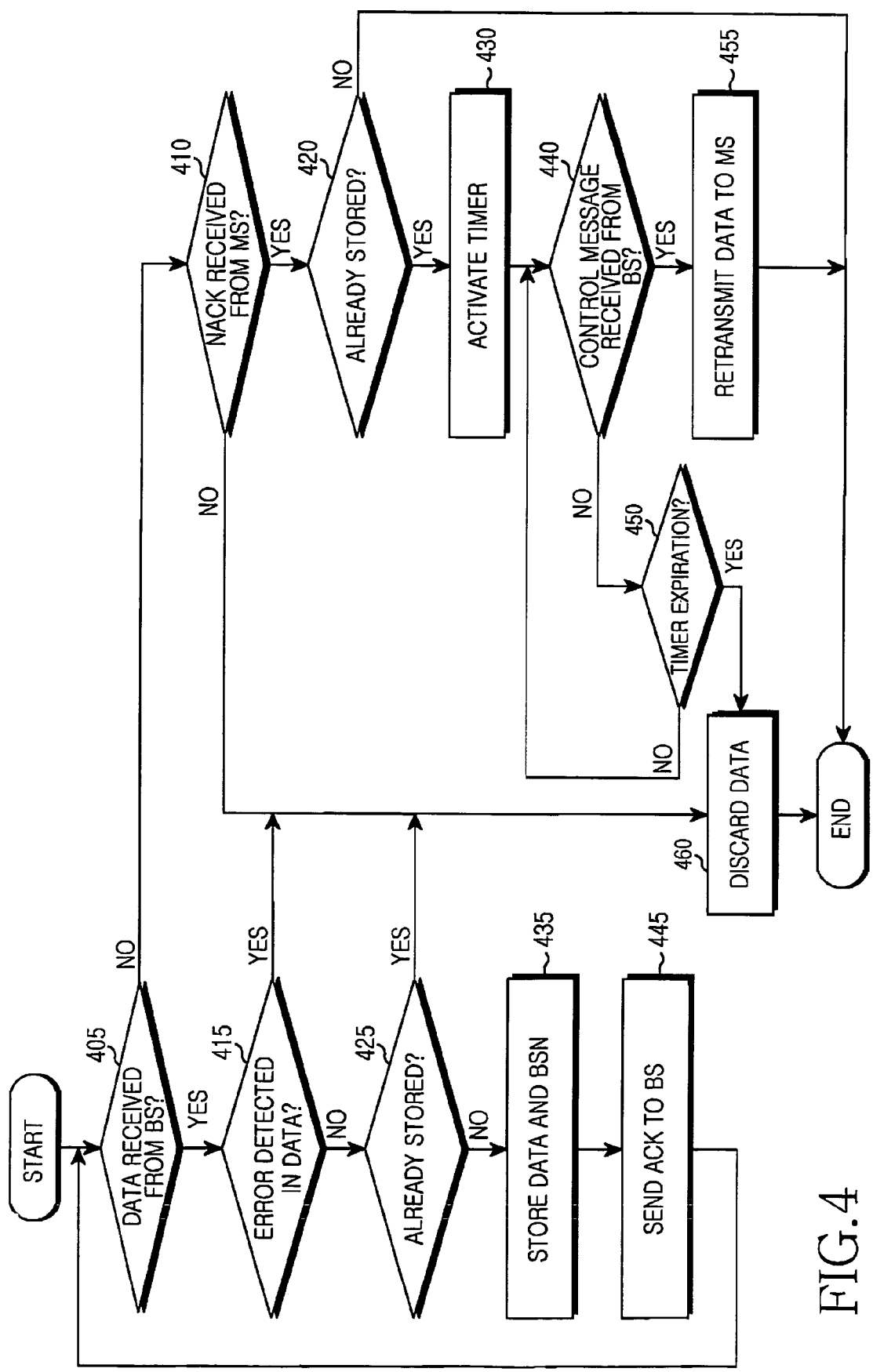
FIG. 4 is a flowchart illustrating a retransmission operation in an RS according to the present invention.

FIG. 4 is a flowchart illustrating a retransmission operation in the RS according to the present invention.

Referring to FIG. 4, upon receipt of a data block from the BS in step 405, the RS checks errors in the data block in step 415. If errors are detected, the RS discards the data block in step 460. If no errors are detected, the RS determines whether the data block is an already stored data block by checking its Block Sequence Number (BSN) in step 425. If the data block has already been stored, the RS discards the data block in step 460.

If the data block is a new data block in step 425, the RS stores the data block together with its BSN in a buffer in step 435.

In step 445, the RS sends an ACK message for the data block to the BS and returns to step 405 to continue the retransmission operation.

If the RS has not received data from the BS in step 405 and receives a NACK from the MS in step 410, the RS discards a data block associated with the NACK in step 460 and ends the retransmission procedure.

If the RS receives a NACK for the data block in step 410, it determines whether the data block is an already stored data block by checking its BSN in step 420. If the data block was not stored, the RS ends the retransmission procedure.

If the data block was stored in step 420, the RS starts a timer and awaits reception of a control message from the BS in step 430. Upon receipt of the control message from the BS in step 440, the RS retransmits the data block to the MS in step 455 and ends the retransmission procedure.

If the RS has not received the control message in step 440 until the timer expires in step 450, the RS discards the data block in step 460 and ends the retransmission procedure.

Figure 5:
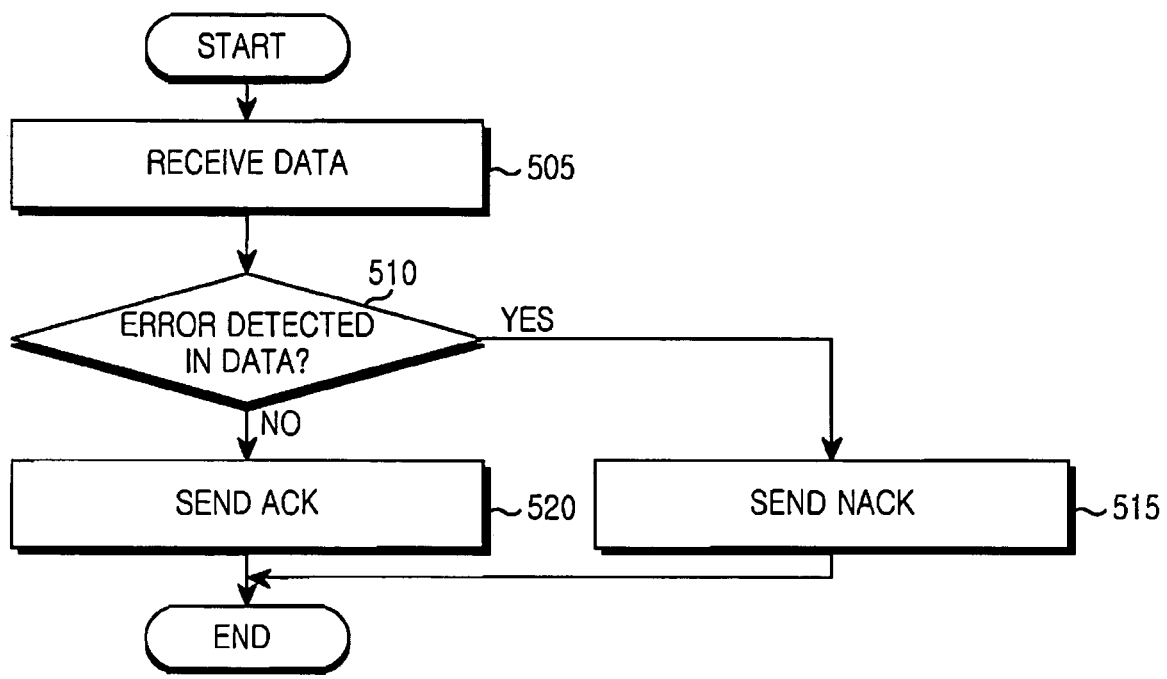
FIG. 5 is a flowchart illustrating an operation of an MS in data retransmission according to the present invention.

FIG. 5 is a flowchart illustrating an operation of the MS in data retransmission according to the present invention.

Referring to FIG. 5, upon receipt of a data block from the BS or the RS in step 505, the MS check errors in the data block in step 510. In the presence of errors, the MS sends a NACK for the data block in step 515 and ends the algorithm. In the absence of errors, the MS sends an ACK for the data block in step 520 and ends the algorithm.

Figure 6:
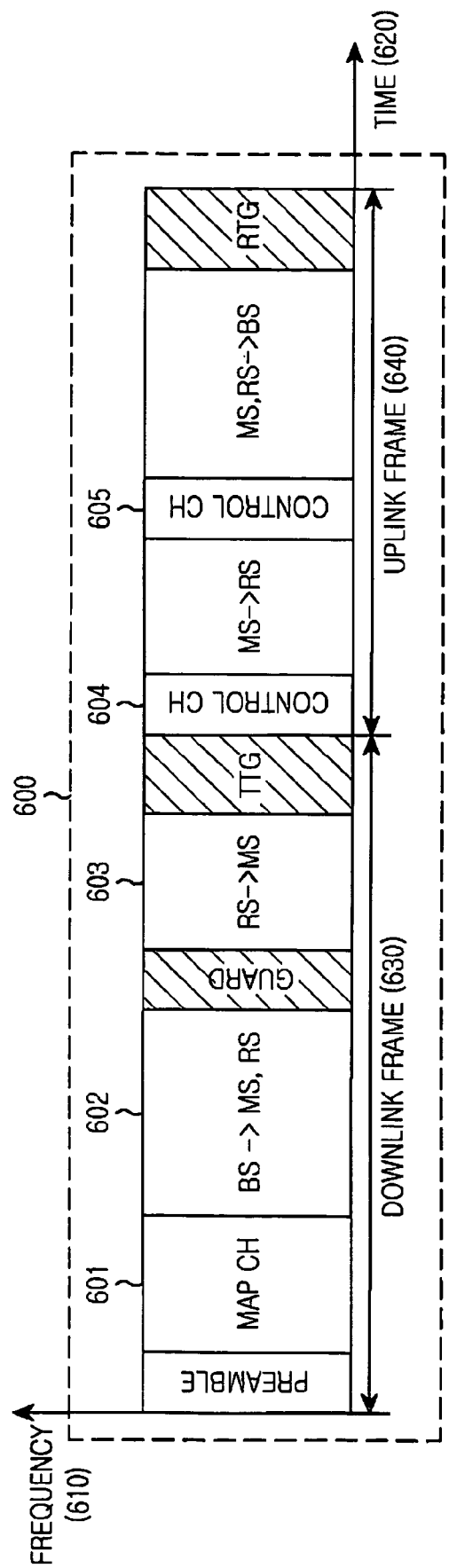
FIG. 6 illustrates the structure of a data frame when the RS is used according to the present invention.

FIG. 6 illustrates the structure of a data frame when the RS is used according to the present invention.

Referring to FIG. 6, the data frame carries data among the BS 210, the RS 230 and the MS 220 at initial transmission and retransmission in the OFDMA-TDD (Time Division Duplexing) system.

A physical frame 600 is defined by resources in frequency 610 and in time 620. The physical frame 600 is divided into a downlink frame 630 and an uplink frame 640.

Data is sent from the BS 210 to the MS 220 or the RS 230 in an area 602 as in steps 201 and 202 of FIG. 2. Upon successful receipt of the data, the MS 220 sends an ACK message on a control channel 605 to the BS 210, as in 203 of FIG. 2. If errors are detected in the data, the MS 220 sends a NACK message on a control channel 604 to the RS 203 as in 204 of FIG. 2.

Receiving the NACK message, the RS 230 sends an ACK message on the control channel 605 to the BS 210 as in 205 of FIG. 2.

The BS 210 sends a control message to the RS 230 in the area 602 as in 206 of FIG. 2. Upon receipt of the control message, the RS 230 sends retransmission data in an area 603 to the MS 220 as in 207 of FIG. 2.

Figure 7:
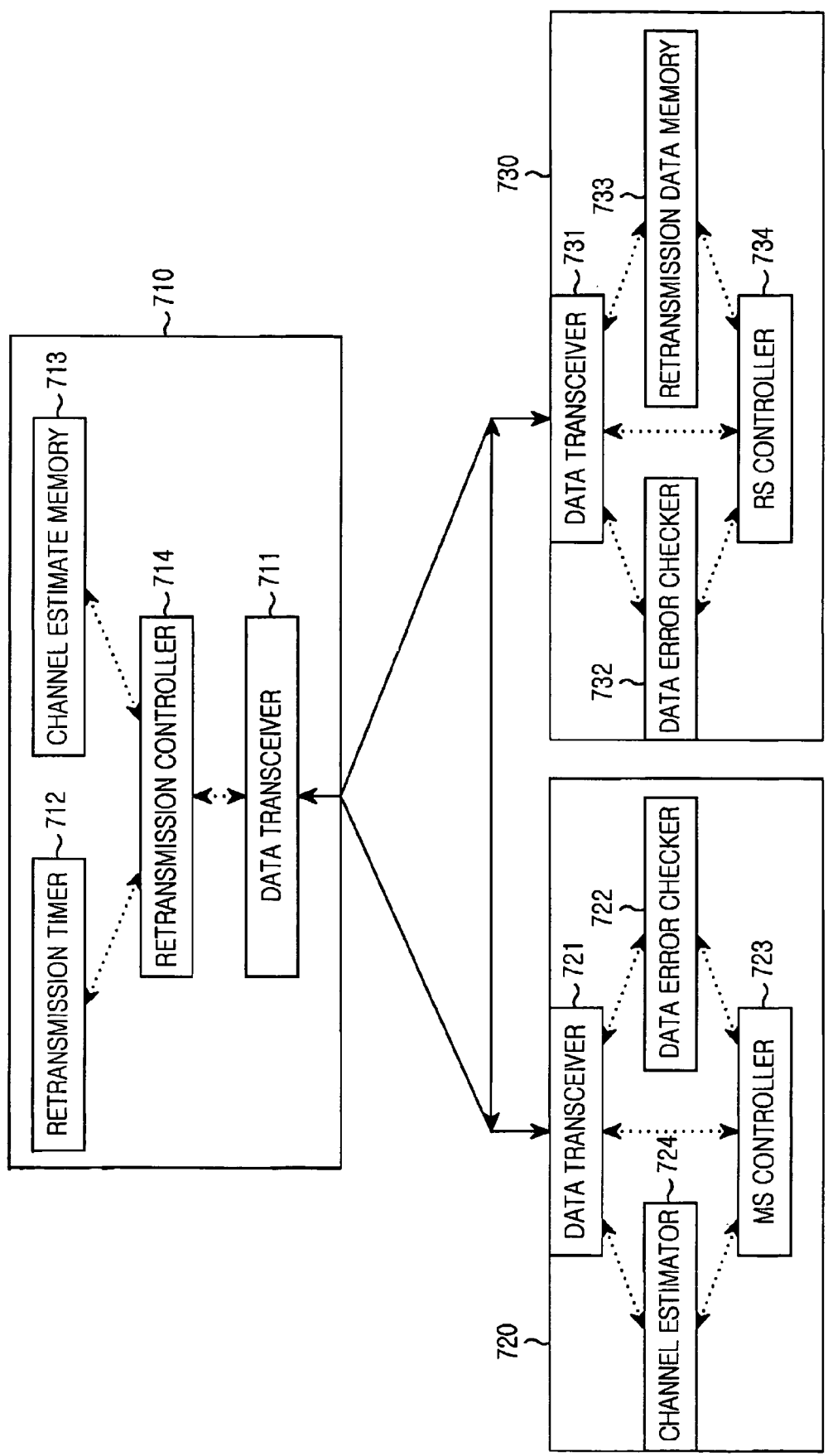
FIG. 7 is a block diagram of the BS, the RS and the MS according to the present invention.

FIG. 7 is a block diagram of the BS, the RS and the MS according to the present invention.

Referring to FIG. 7, a BS 710, an MS 720 and an RS 730 send and receive data wirelessly through data transceivers 711, 721 and 731, respectively.

The physical data transceivers 711, 721 and 731 are identical in configuration. Each data transceiver includes an encoder, a decoder, a modulator, a demodulator, a Fast Fourier Transform (FFT) processor, an Inverse Fast Fourier Transform (IFFT) processor, a Digital-to-Analog Converter (DAC), an Analog-to-Digital Converter and an RF processor.

In the BS 710, a retransmission controller 714 enables retransmission. Specifically, after data transmission, the retransmission controller 714 activates a timer, determines whether the timer has expired, monitors receipt of an ACK or NACK signal for the transmitted data, and determines whether to retransmit the data and to which entity to retransmit the data according to channel status.

A retransmission timer 712 is activated by the retransmission controller 714, after data transmission. In the present invention, there is a timer for data sent by the BS 710 and a timer for data retransmitted by the RS 730.

A channel estimate memory 713 stores information about the channel status between the BS 710 and the RS 730 and information about the channel status between the BS 710 and the MS 720, represented as, for example, Signal-to-Interference and Noise Ratios (SINRs), Received Signal Strength Indicators (RSSIs) or Channel-to-Interference and Noise Ratios (CINRs).

In the MS 720, a data error checker 722 indicates the result of an error check on received data to an MS controller 723.

The MS controller 723 decides whether to send an ACK or NACK signal for the received data based on the error check result.

A channel estimator 724 estimates the channel status between the BS 710 and the MS 720 or between the RS 730 and the MS 720, for example, an SINR, RSSI or CINR and provides the channel estimate to the MS controller 723. The MS controller 723 sends the ACK or NACK signal to the BS 710 through the data transceiver 721.

In the RS 730, a data error checker 732 checks errors in received data. An RS controller 734 is responsible for typical retransmission control and stores the received data in a retransmission data memory 733 if it is determined based on the error check result that the data has been successfully received and the data is not yet stored.

When receiving a NACK signal from the MS 720, the RS controller 734 sends an ACK signal for data associated with the NACK signal to the BS 710, if the data exists in the retransmission data memory 733. Also, the RS controller 734 retransmits data to the MS 720 according to a control message received from the BS 710.

As described above, the present invention advantageously selects a retransmission entity between a BS and an RS according to channel status in a multi-hop network, thereby promoting efficient retransmission.

Also, the use of retransmission increases communication reliability among a BS, an RS and an MS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of retransmitting data in a Base Station (BS) in a multi-hop network, comprising the steps of:
   transmitting data and activating a timer for the data;
   monitoring receipt of a response message for the data until the timer expires after the timer activation;
   receiving the response message and, if the response message is a Non-Acknowledgement (NACK), determining whether a Relay Station (RS) has successfully received the data with a Block Sequence Number (BSN) associated with the NACK;
   retransmitting the data, if the RS has not successfully received the data;
   determining a retransmission entity, if the RS has successfully received the data;
   transmitting a control message commanding retransmission to the RS, if the retransmission entity is the RS; and
   retransmitting the data, if the retransmission entity is the BS.

2. The method of claim 1, further comprising:
   determining whether the timer has expired, after the data retransmission if the retransmission entity is the BS;
   monitoring, if the timer has not expired, a response message for the retransmitted data until the timer expires.

3. The method of claim 2, further comprising returning to the step of activating the timer if the timer has expired.

4. The method of claim 1, further comprising deactivating the timer, if the response message is an Acknowledgement (ACK) from a Mobile Station (MS).

5. The method of claim 1, further comprising:
   storing a Block Sequence Number (BSN) of the data, if the response message is an Acknowledgement (ACK) from the RS; and
   returning to the step of monitoring receipt of the response message for the data until the timer expires, after storing the BSN.

6. The method of claim 1, wherein determining the retransmission entity further comprises determining a node in an improved channel status as the retransmission entity, considering radio channel information or location information between the BS and the MS and radio channel information or location information between the RS and the MS.

7. A method of retransmitting data in a Relay Station (RS) in a multi-hop network, comprising the steps of:
- receiving data;
- checking errors in the received data, if the data has been sent by a Base Station (BS);
- determining whether the data has already been stored, if the data has no errors;
- storing the data, if the data has not been stored;
- transmitting an Acknowledgement (ACK) to the BS;
- determining, if the data is a Non-Acknowledgement (NACK) from a Mobile Station (MS), whether data with a Block Sequence Number (BSN) associated with the NACK has already been stored;
- activating a timer, if the data with the BSN associated with the NACK has already been stored;
- monitoring receipt of a control message commanding retransmission from the BS until the timer expires; and
- transmitting the data with the BSN associated with the NACK to the MS, upon receipt of the control message from the BS.

8. The method of claim 7, further comprising discarding the data, if the data has errors.

9. The method of claim 7, further comprising discarding the data, if the data has already been stored.

10. The method of claim 7, further comprising:
- determining whether the timer has expired, if the RS has not received the control message from the BS;
- returning to the step of monitoring receipt of the control message commanding retransmission from the BS; and
- discarding the data with the BSN associated with the NACK, if the timer expires.

11. A Base Station (BS) apparatus in a multi-hop network, comprising:
- a retransmission timer for indicating an amount of time after data is transmitted;
- a data transceiver for transmitting and receiving data;
- a channel estimate memory for storing radio channel information or location information between the BS and a Relay Station (RS) and between the RS and a Mobile Station (MS), received from the data transceiver; and
- a retransmission controller for controlling the retransmission timer, the channel estimate memory and the data transceiver, receiving a reception result of the transmitted data from the RS or the MS until the retransmission timer expires, and transmitting a control message commanding retransmission to the RS through the data transceiver, if a retransmission entity is the RS, and retransmitting the data, if the retransmission entity is the BS,
- wherein the retransmission controller stores a Block Sequence Number (BSN) of the data if the reception result of the transmitted data is an ACK from the RS.

12. The BS apparatus of claim 11, wherein the retransmission controller deactivates the retransmission timer if the reception result of the transmitted data is an Acknowledgement (ACK) from the MS.

13. The BS apparatus of claim 11, wherein the retransmission controller selects a node in an improved channel status between the BS and the RS according to the radio channel information or the location information.

14. The BS apparatus of claim 11, wherein the retransmission controller retransmits the data through the data transceiver if the retransmission entity is the BS.

15. A Relay Station (RS) apparatus in a multi-hop network, comprising:
- a data error checker for checking errors in received data;
- a data transceiver for transmitting and receiving data;
- a retransmission data memory for storing data and a Block Sequence Number (BSN) of the data, if the data has no errors and has not been stored; and
- a retransmission controller for controlling the data error checker, the retransmission data memory and the data transceiver, storing data received from a Base Station (BS) and the BSN of the received data, if the received data has no errors and has not been stored, and transmitting an Acknowledgement (ACK) to the BS,
- wherein upon receipt of a Non-Acknowledgement (NACK) from a Mobile Station (MS), the retransmission controller activates a timer, if data with a BSN associated with the NACK has already been stored, and retransmitting the data with the BSN associated with the NACK, upon receipt of a control message commanding retransmission from the BS before the timer expires.

16. The RS apparatus of claim 15, wherein upon receipt of a Non-Acknowledgement (NACK) from the MS, the retransmission controller activates the timer, if data with a BSN associated with the NACK has already been stored, and discarding the data with the BSN associated with the NACK, if a control message commanding retransmission is not received from the BS until the timer expires.

17. The RS apparatus of claim 15, wherein the retransmission controller discards data having errors in an error check of the data error checker or already stored data.

18. A retransmission system in a multi-hop network, comprising:
- a Base Station (BS) for activating a first timer after transmitting data, determining whether a Relay Station (RS) has successfully received the data if a Non-Acknowledgement (NACK) is received before the first timer expires, determining a retransmission entity if the RS has received the data successfully, transmitting a control message commanding retransmission to the RS if the retransmission entity is the RS, deactivating the first timer if an Acknowledgement (ACK) is received from a Mobile Station (MS) before the first timer expires, and starting data transmission if the reception result of the transmitted data has not been received until the first timer expires;
- the RS for receiving the data from the BS, storing the data and the Block Sequence Number (BSN) of the data if the data has no errors and has not been stored, transmitting an ACK for the data, activating a second timer if a NACK is received for the data from the MS and the data with a BSN associated with the NACK has already been stored, and retransmitting the data with the BSN associated with the NACK, if the control message is received before the second timer expires; and
- the MS for receiving the data from the BS or the RS, transmitting the NACK for the data if the data has errors, and transmitting an ACK for the data if the data has no errors.

19. The retransmission system of claim 18, wherein the BS stores the BSN of the data associated with an ACK if the ACK is received from the RS before the first timer expires.

20. The retransmission system of claim 18, wherein the BS retransmits the data if the retransmission entity is the BS.

21. The retransmission system of claim 18, wherein the RS discards the data with the BSN associated with the NACK if the control message has not been received until the second timer expires.

* * * * *